United States Patent [19]

Turcotte

[11] 4,165,457
[45] Aug. 21, 1979

[54] THERMOSTATICALLY CONTROLLED PRE-WELD HEATER

[75] Inventor: Gordon W. Turcotte, Gorham, Me.

[73] Assignee: International Telephone & Telegraph Corp., Nutley, N.J.

[21] Appl. No.: 870,892

[22] Filed: Jan. 19, 1978

[51] Int. Cl.² ............................................. H05B 1/02
[52] U.S. Cl. .................................... 219/516; 219/510; 219/530; 219/535
[58] Field of Search ............... 219/311, 331, 516, 510, 219/530, 531, 535, 536, 537, 538, 540, 542, 549; 165/46, 185

[56] References Cited

U.S. PATENT DOCUMENTS

| | | | |
|---|---|---|---|
| 2,575,150 | 11/1951 | Wellman | 219/516 X |
| 2,668,898 | 2/1954 | Husaczka et al. | 219/535 X |
| 3,032,861 | 5/1962 | Foster | 219/530 X |
| 3,045,098 | 7/1962 | Norton | 219/535 |
| 3,134,008 | 5/1964 | Finn | 219/516 X |
| 3,187,161 | 6/1965 | Finn | 219/331 |
| 3,207,887 | 9/1965 | Drugmand et al. | 219/535 |
| 3,305,668 | 2/1967 | Smith | 219/535 X |
| 3,384,195 | 5/1968 | Jepson et al. | 219/516 X |
| 3,404,256 | 10/1968 | Finn | 219/311 |
| 3,730,262 | 5/1973 | Drugmond | 219/535 X |

Primary Examiner—Volodymyr Y. Mayewsky
Attorney, Agent, or Firm—John T. O'Halloran; Robert A. Walsh

[57] ABSTRACT

A thermostatically controlled pre-weld heater is described in which a temperature sensor is mounted, intermediate the legs of a pre-weld heater, in a position to sense accurately, and then thereby to control, the temperature of the workpiece so as to accurately control the temperature of the area to be welded by opening and closing the circuit to the electrical current supplied to the heater coil in the legs of the pre-weld heater.

2 Claims, 2 Drawing Figures

U.S. Patent    Aug. 21, 1979    4,165,457
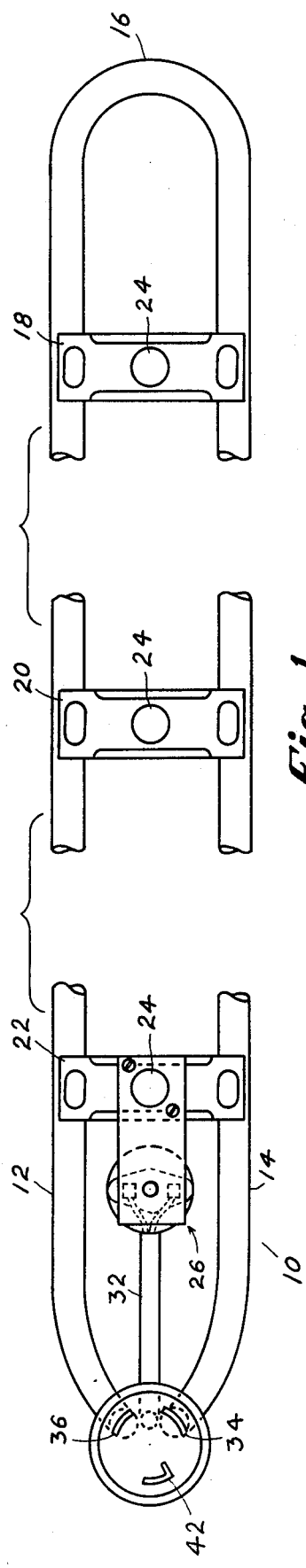
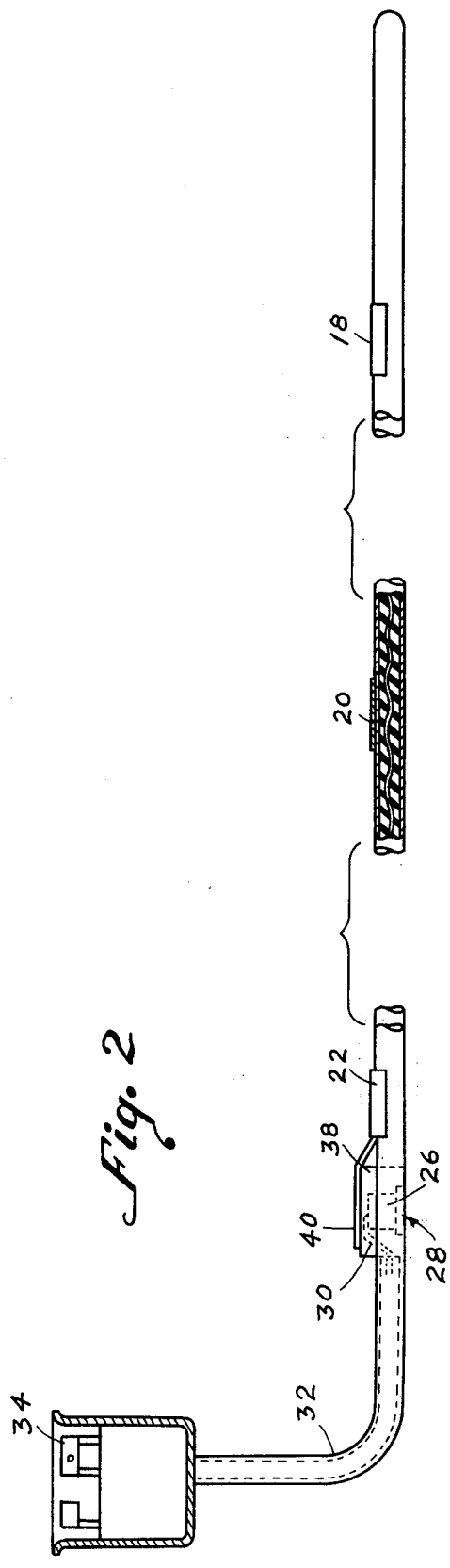

THERMOSTATICALLY CONTROLLED PRE-WELD HEATER

BACKGROUND OF THE INVENTION

1. Field of the Invention

Electric pre-weld heaters.

2. Prior Art

A relatively new product which has achieved some substantial success is constituted by an electric pre-weld heater. An elongated U-shaped heater is supplied with current sufficient to cause the heater coil in parallel legs of the unit to heat up the work pieces being welded together. The localized preheating of steel for arc welding is a prime necessity in high-stress areas of metal construction. The prior art electric pre-weld heaters used in localized weld pre-heating ensure compatibility with an arc welding process as well as maintaining high strength and ductility of the weld areas generally equal to the parent metal.

The localized, electric pre-weld heaters are a tubular style using a high temp alloy sheath material with a helical heat coil imbedded in magnesium oxide. The sheath is formed into a hairpin configuration, maybe then flattened on one side to increase the contact surface to the parent metal if desired. The terminal ends are bent up to prevent the plugs and wire from contacting the hot surface. Mounting brackets are provided across the hairpin at various locations. The brackets are placed over tackwelded threaded studs on the metal and are drawn up tight using bolts. The heaters normally are annealed to facilitate bending them to fit slightly curved surfaces. Various shapes of the pre-weld heaters have been provided by the prior construction.

SUMMARY OF THE INVENTION

In use, the localized pre-heating or pre-weld heaters of the prior art have been found to be difficult to use in that control of the pre-heated localized area has been difficult. In order to overcome this difficulty this invention discloses an integrated construction in which, intermediate the two legs of the pre-weld heater, there is positioned a thermostat located so that its sensitive area contacts directly the parent metal at the area of the weld in order to ensure accurate and sensitive heat control for the localized pre-heating operation. One of the mounting brackets has attached to it a sensor support bracket to which is attached a cup containing the thermostatic element embedded in silicone rubber material. The leads to the thermostat are in the cup and are passed through a metal tube which extends into the power receptacle area for connection across the circuit which includes the heater coil.

It has been found in practice that the contruction of this invention materially improves the reproduceability and quality of the resulting weld.

BRIEF DESCRIPTION OF THE DRAWINGS

FIG. 1 is a partial plan view of the thermostatically controlled electric pre-weld heater of this invention; and FIG. 2 is an elevation in partial section of the device illustrated in FIG. 1.

DESCRIPTION OF THE PREFERRED EMBODIMENT

The device of this invention, illustrated generally at 10, comprises a hairpin shaped tubular type heating element having a pair of parallel legs 12, 14 and a rounded end portion 16. Mounting brackets 18, 20, 22 are illustrated for the sake of reference it being understood that depending on the length and the amount of rigidity required more than the three mounting brackets may be employed. Each of the mounting brackets 18, 20, 22 are attached, as by tackwelding, to the sheath of the parallel legs 12, 14 so as to rigidly attach them to the legs 12, 14. Openings 24 in each of the brackets 18, 20, 22 are provided through which are past threaded studs (not shown) tackwelded to the parent metal. Through the use of nuts (not shown) the assembly 10 is rigidly affixed to the parent metal. The lower portion of each of the legs 12, 14 maybe flattened, if desired, in such a manner as to increase the surface area contact and so that the device 10 will not rock when placed on a flat surface.

A thermostatic element 26 having a flat bottom face 28 is positioned so that the bottom face 28 is co-planar with the flattened bottom portions of the parallel legs 12, 14. Leads 30 interconnecting the thermostat 26 in the electrical circuit are passed through a metal tube 32 and are in turn interconnected between the power terminals 34, 36 so that the thermostat 26 is across the circuit to the heater coil (not shown) which is contained within the legs 12, 14.

In a typical installation a thermostat 26 would have a rating at 277 volts drawing 10 amps so that its temperature control range would be such as to open at 300° F. and to close at 270° F.

The thermostatic weld tube 32 is brazed or welded to a cup 38 which in turn is tackwelded to a sensor bracket 40 which is tackwelded or otherwise attached to the bracket 22.

The power connector includes the usual grounding lug 42, the configuration being shown for the connectors 34, 36 and 42 thereby constituting a conventional twist lock female plug of the three wire ground type.

By connecting the power connectors 34, 36 to the heater coil (not shown) in legs 12, 14 the thermostat 26 acts to interrupt the flow of current to the heat coils at a predesigned preset temperature as for example a thermostat 26 which will open the coil's circuit at 300° F. and close at 270° F.

Both the connectors and leads to the thermostat 26 are included within cups which are preferably filled with epoxy or other insulating material.

It will be understood that the embodiment described is for illustrative purposes only and that modifications can be made to the draft which do not depart from the scope of the appended claims.

What is claimed is:

1. An electrical heater for preheating a localized area to be welded of a parent metal comprising an electrical heating coil embedded in magnesium oxide and disposed within a metallic sheath having electrical connections for connecting said coil to a source of electrical power, said sheath having a flattened bottom portion adapted to increase the amount of surface contact between said bottom portion of said sheath and said parent metal, an integrally connected and mounted thermostatic control element positioned to contact said parent metal in the area where said weld is to be made, said thermostatic control element being connected to said electrical heating coil to open and close the electrical connection to the heating coil about a preselected temperature; and mounting brackets for attaching said heater to said parent metal and further including a sensor mounting bracket attached to one of said mounting brackets, said thermostatic control element being attached to said sensor bracket to position said thermostatic control element in direct contact with said parent metal in said localized area where said weld is to be made.

2. An electrical heating element for heating a localized area of parent metal to be welded comprising:

a generally hairpin shaped tubular metallic sheath having a pair of substantially parallel legs, said sheath containing a heater coil embedded in magnesium oxide;

mounting brackets interconnecting said legs of said hairpin shaped sheath for attaching said heating element to said parent metal;

thermostatic control means positioned between said hairpin legs in said localized area where said weld is to be made; and means interconnecting said thermostatic control element across the heater coil and adapted to open and close the electrical connection to said heater coil at preselected temperatures whereby the temperature of the parent metal in the area of the weld can be accurately controlled.

* * * * *